Figure 2:
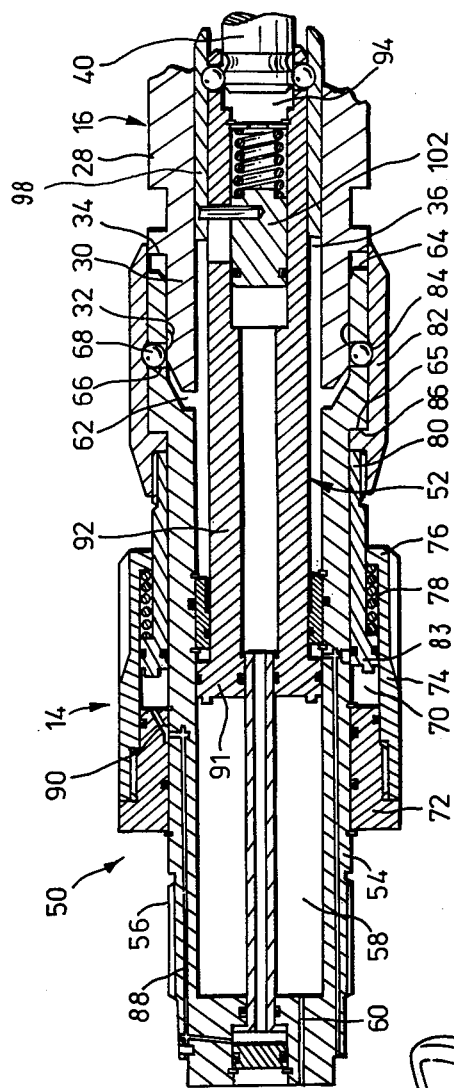

United States Patent [19]

Woodford et al.

[11] 4,227,853
[45] Oct. 14, 1980

[54] MANIPULATOR WRIST TOOL INTERFACE

[75] Inventors: Alan T. Woodford, Owen Sound, Canada; Michel R. Horellou, Bordeaux, France

[73] Assignee: Spar Aerospace Limited, Toronto, Canada

[21] Appl. No.: 9,847

[22] Filed: Feb. 6, 1979

[51] Int. Cl.³ .............................................. B66C 3/16
[52] U.S. Cl. .................................. 414/738; 403/322; 414/4
[58] Field of Search ................... 414/4, 728, 738, 739, 414/740, 741, 744 A, 751; 403/322 X, DIG. 8

[56] References Cited

U.S. PATENT DOCUMENTS

| 3,451,224 | 6/1969 | Colechia et al. | 414/738 X |
| 3,610,438 | 10/1971 | Opdahl | 414/738 |

*Primary Examiner*—Stephen G. Kunin
*Assistant Examiner*—George F. Abraham
*Attorney, Agent, or Firm*—Fetherstonhaugh & Co.

[57] ABSTRACT

A coupler for connecting a manipulator arm of a remote manipulator device to a tool body and its associated tool anchor linkage constructed according to the present invention comprises a tool holder adapted to be secured to the manipulator arm and a tool actuator piston mounted in a cylinder in the tool holder. The tool holder has a first latching mechanism for releasably securing a tool body with respect to the tool holder. The tool actuator piston has a second latching mechanism at one end thereof for releasably securing a tool actuator arm thereto. The second latching mechanism is located at an end of the tool holder inwardly from the first latching mechanism. The tool holder including a first cylinder which is connectable to a source of pressurized fluid whereby the tool actuator piston may be reciprocally driven with respect to the tool holder in response to variations in the fluid pressure in the first cylinder to provide a drive force for driving the tool actuator of a tool with respect to the tool holder. One end of the tool actuator piston projects outwardly a substantial distance from an end of the tool holder so as to be readily visible to facilitate insertion thereof into a socket in a tool to be coupled by the coupler to the manipulator arm.

3 Claims, 3 Drawing Figures

U.S. Patent  Oct. 14, 1980  4,227,853

MANIPULATOR WRIST TOOL INTERFACE

This invention relates to improvements in remote manipulator mechanisms. In particular, this invention relates to improvements in a coupler/tool interface for use in a remote manipulator device.

In equipment which is designed to operate under water and in McCullan "hot cell" application, it is common to provide a manipulator arm which serves to support any one of a number of power tools such as a drill, a cutter, a spreader, a jaw or a hook hand. The nature of the various operations which are to be carried out by equipment of this type is such that it may be necessary to drill a hole and thereafter to cut an opening in the submerged workpiece. Difficulty has, however, been experienced in attempting to provide a tool coupler interface which will permit the underwater replacement of one tool element with another tool element. The present invention overcomes this difficulty and provides a simple and efficient coupler for connecting a tool body and its associated tool actuator linkage to a manipulator arm of a remote manipulator device.

According to one aspect of the present invention, there is provided in a coupler for connecting a tool body and its associated tool actuator linkage to a manipulator arm of a remote manipulator device comprising a tool holder adapted to be secured to the manipulator arm, first latching means on the tool holder at one end thereof for releasably securing a tool body with respect to said tool holder, a tool actuator piston mounted in a first cylinder located within said tool holder, said tool actuator piston having second latching means at one end thereof for releasably securing a tool actuator arm thereto, said second latching means being located at said one end of said tool holder inwardly from said first latching means, said first cylinder being connectable to a source of pressurized fluid whereby said tool actuator piston may be reciprically driven with respect to said tool holder in response to variations in fluid pressure in said first cylinder between an extended position and the retracted position to provide a drive force for driving a tool actuator of a tool held fast with respect to said tool holder by said first latching means, said one end of said tool actuator piston projecting outwardly a substantial distance from said one end of said tool holder so as to be readily visible to facilitate insertion thereof into a socket in a tool to be coupled by the coupler to said manipulator arm.

According to a further aspect of the present invention, there is provided in a remote manipulator device which includes a manipulator arm, a tool and a coupler for releasably connecting the tool to the manipulator arm, the improvement wherein said tool comprises a tool body having a male coupling face at one end thereof and a socket opening inwardly from said one end, and a tool actuator linkage mounted on said tool body for movement relative thereto, said tool actuator linkage including an actuator pin having its free end disposed within and accessible at said socket, first latching recess means formed in said male coupling face and second latching recess means formed in said actuator pin, and wherein said coupler comprises a tool holder comprising a coupler body adapted to be secured to a manipulator arm and having an actuator cylinder located therein, a first latching passage opening inwardly from one end of said coupler body to receive said male coupling face of said tool body in a close fitting relationship, first detent means mounted on said coupler body for movement into and out of latching engagement with said first latching recess means of said tool body, first ramp means mounted on said coupler body outwardly from said first detent means for movement relative to said coupler body for ramping said detent means inwardly and outwardly with respect to said first locking recess in use, a first latching cylinder formed in said coupler body outwardly from said actuator cylinder, a first latching piston on said first ramp means slidably mounted in said first latching cylinder for movement relative to said coupler body betweem a latching position securing said first detent means in latching engagement with said first latching recess means and a release position permitting release of said first detent means from said first latching recess means and a tool actuator comprising an actuator piston slidably mounted in said actuator cylinder for movement between an extended position and a retracted position in response to variations in fluid pressure within said actuator cylinder, said actuator piston having a free end exposed at said first end of said coupler body, said free end of said actuator piston projecting outwardly a substantial distance from one end of said coupler body when in said extended position so as to be readily visible to facilitate insertion thereof into said socket of said tool, a second latching passage opening inwardly from said free end of said actuator piston to receive said free end of said tool actuator pin in a close fitting relationship, second detent means mounted on said actuator piston for movement relative to said actuator piston into and out of latching engagement with said second locking recess means of said actuator pin, second ramp means mounted on said actuator piston outwardly from said first detent means for movement relative to said actuator piston for ramping said second detent means into and out of locking engagement with said latching recess means of said actuator pin, a second latching cylinder formed in said actuator piston, a second latching piston on said second ramp means slidably mounted in said second latching cylinder for movement relative to said actuator piston between a latching position securing said second detent means in its latching position and a release position for permitting release of said second detent means.

Figure 3:
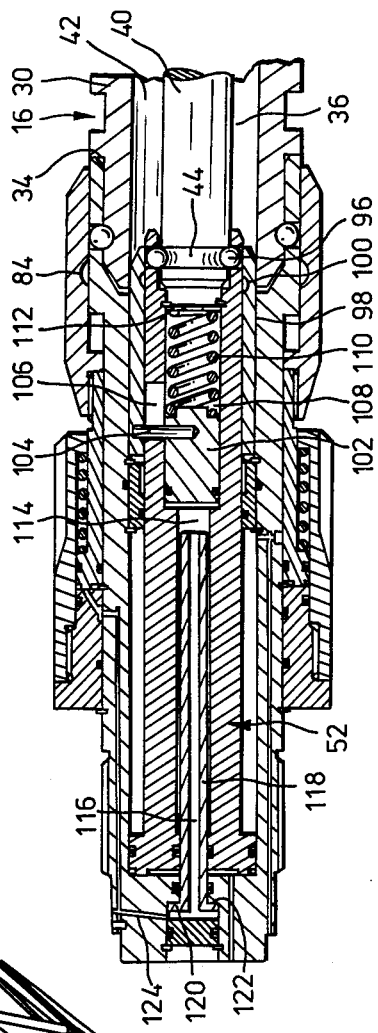
Figure 1:
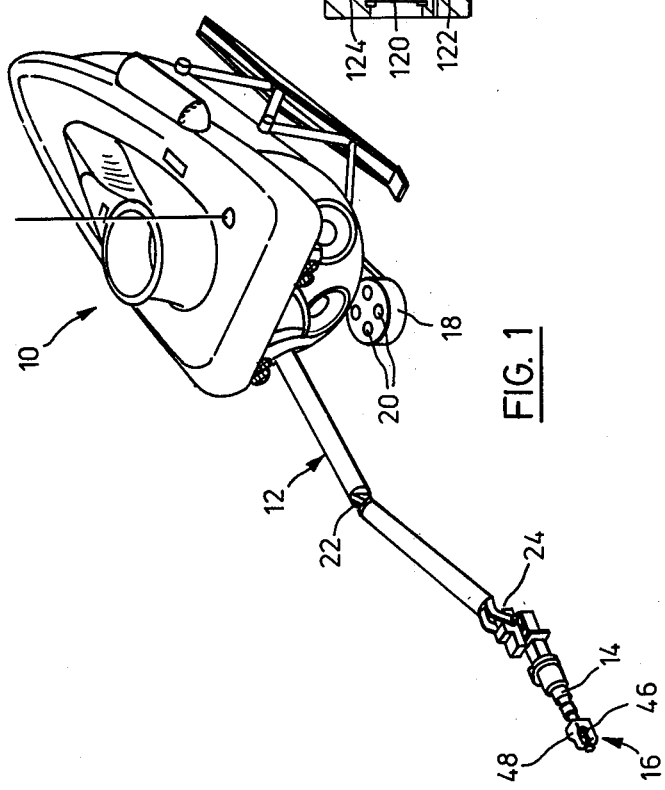

The invention will be more clearly understood after reference to the following detailed specification read in conjunction with the drawings wherein, FIG. 1 is a pictorial illustration of a submergable vehicle having a remote manipulator arm and a tool releasably secured thereto, FIG. 2 is a longitudinal sectional view through a coupler constructed in accordance with an embodiment of the present invention, and FIG. 3 is a longitudinal sectional view similar to FIG. 2 showing the coupler in the latching position.

With reference to FIG. 1 of the drawings, the reference numeral 10 refers generally to submergible vehicle which has a manipulator arm 12 mounted thereon. A coupler 14 is provided for the purposes of releasably securing a tool 16 to the manipulator arm, replacement tools being housed in a tool holder 18 so that any one of a number of tools may be selectively connected to the manipulator arm by means of the coupler 14. As previously indicated, the tools 16 may include a drill, a cutter or a hand or the like, the various tools being located in tool holding compartments 20 of the housing 18. The manipulator arm 12 is operable from the vehicle 10 in order to control the position of the tool 16 by means of a shoulder connection 22 and a wrist connection 24.

With reference to FIGS. 2 and 3 of the drawings, it will be seen that the tool 16 has a tool body 28 at one end of which a cylindrical shaped male coupling element is formed. The male coupling element 30 has a plurality of circumferentially spaced latching recesses 32 extending inwardly from the outer surface thereof. The latching recesses 32 are circumferentially spaced so that a torque may be transmitted to the tool body by engagement of the sides of the latching recesses 32 with a detent projecting inwardly thereof in use. A shoulder 34 projects radially outwardly from the outer surface of the male coupler element 30. The tool body 28 also has a socket 36 opening inwardly from the free end of the male coupling element 30. The actuator stem 40 of the tool is arranged co-axially within the socket 36 and an annular passage 42 is provided between the stem 40 and the inner surface of the socket 36. The actuator stem 40 has an annular groove 44 adjacent the outer end thereof which serves as a second detent recess.

It will be understood that by reciprocating the actuator stem 40, the clamping element 46 may be moved relative to the stationary hook and elements 48 (FIG. 1).

The coupler 14 (FIGS. 2 and 3) consists of a tool holder generally identified by the reference numeral 50 and a tool actuator generally identified by the reference numeral 52. The tool holder serves to hold the body of the tool and the tool actuator 52 serves to actuate the actuator linkage mechanism while the body of the tool is held fast by the tool holder.

The tool holder consists of a coupler body 54 which is threaded at 56 for connection to the wrist 24 of the manipulator arm. The coupler body 54 has an actuator cylinder 58 formed therein. A passage 60 is provided for conveying hydraulic fluid from a suitable source to the cylinder 58. A first latching passage 62 opens inwardly from the free end of the coupler body and is adapted to receive the male coupling element 30 of the tool body in a close fitting sliding relationship, the end 64 of the coupler body abutting the shoulder 34 of the tool body to limit the penetration of the male coupler element into the latching recess 62. A plurality of passages 66 open through the wall of the coupler body into the first latching passage 62 and a latching ball 68 is located in each passage 66. The latching balls 68 act as first detents which are locatable in a position extending between the latching recesses 32 and the latching passages 66 so as to secure the tool body 30 with respect to the tool holder 50 in a manner which will permit torque to be transmitted from the wrist 14 through the tool holder 50 to the tool body 30 so that the tool may be rotatably driven. A ring 72 is secured on the outer surface of the coupler body 54 and a sleeve 74 is threadably mounted on the ring 72 and projects forwardly therefrom to form a first latching cylinder 70 between the sleeve 74 and the coupler body 54. A lip 76 projects radially inwardly from the end of the sleeve 74 and forms a support supporting one end of a coil spring 78 which is located within the cylinder 70. A first latching piston 80 is annular in shape and has a piston head 83 slidably mounted in the annular first latching cylinder 70. The other end of the coil spring 78 bears against the piston head 83 and the coil spring 78 normally urges the latching piston 80 away from the lip 76. The latching piston 80 has a first ramp sleeve 82 threadably secured to the free end thereof, the latching ramp sleeve 82 has an annular latching recess 84 located therein which is alignable with the latching balls 68 to permit the latching balls to be ramped outwardly away from the tool body to release the tool body. The latching ramp sleeve 82 has a shoulder 86 formed thereon which abuts the shoulder 65 of the coupler body when the latching recess 84 is aligned with the latching balls 68.

Hydraulic fluid is admitted to the first latching cylinder 70 by way of passages 88 and 90 formed in the coupler body and the ring 72. By increasing the pressure in the first latching cylinder 70 it is possible to move the first latching mechanism to the position aligning the recess 84 with the latching ball 68 to permit the latching ball to be ramped outwardly so that the tool body 30 may be moved into and out of engagement with the first latching passage 62.

The tool actuator 52 consists of an actuator piston which has a head portion 91 slidably mounted in the actuator cylinder 58 for movement between the extended position shown in FIG. 2 and the retracted position shown in FIG. 3 of the drawings. The piston 52 has an elongated body portion 92 formed with a second latching passage 94 at the free end thereof. The latching passage 94 is proportioned to receive the end of the actuator pin 40 in close fitting relationship. Second detent means in the form of a plurality of latching balls 96 are mounted on the actuator piston for movement relative thereto into and out of latching engagement with the latching recess 44 of the actuator pin 40. A second latching ramp in the form of a sleeve 98 is slidably mounted on the actuator piston for movement between the extended position shown in FIG. 2 and the retracted position shown in FIG. 3. In the extended position the latching recess 100 in the sleeve 98 is aligned with the latching balls 96 to permit the balls 96 to be ramped outwardly to release the actuator pin 40 and when in the retracted position shown in FIG. 3, the latching recess 100 is out of alignment with the latching balls 96 and as a result the latching balls are retained in their inwardly projecting position engaging the actuator pin 40. The ramp sleeve is connected to the second latching piston 102 by means of a connecting pin 104 which projects through an elongated slot 106 formed in the wall of the actuator piston.

A second latching cylinder 108 is formed in the free end of the actuator piston. The second latching piston 102 is slidably mounted in the second latching cylinder 108. A return spring 110 has one end bearing against the piston 102 and its other end secured with respect to the actuator piston by means of a mounting clip 112. Hydraulic fluid is admitted to the second latching cylinder 108 through a passage 114 which is formed in the piston 52 and a passage 116 formed in a conduit 118 which is mounted to telescope with respect to actuator piston 52. The conduit 108 has an annular shoulder 120 at the outer end thereof which is supported by a shoulder 122 formed in the coupler body. A passage 124 communicates between a source of pressurized hydraulic fluid and the passage 116 so that hydraulic fluid may be directed to the second latching chamber to move the second latching piston 102.

It will be noted that when the tool actuator 52 is in the extended position as shown in FIG. 2, the free end thereof projects a substantial distance outwardly from the free end of the tool holder so that it will be readily visible from a remote location to facilitate the insertion thereof into the latching chamber 36 of the tool 16. This is an important feature in facilitating the exchange of tools in association with the tool magazine 18.

From the foregoing, it will be apparent that the apparatus of the present invention provides a hydraulically actuated device for interfacing tools anbd is adapted to provide high force actuation by means of the manipulator mechanism. The coupler is extremely compact by reason of the co-axial relationship of the holder and actuator mechanism. This is of considerable importance in remote manipulator devices in which it is desirous to avoid obstructing the operator's view of the workpiece by the support mechanism. Furthermore, the "peg-in-hole" nature of the connection formed between the coupler and the tool provides greater visibility in the coupling action than can be achieved by devices designed to operate on a "cup-over-peg" principle.

The coupler described in the preferred embodiment provides a structure which permits the forces necessary to progressively align the tool (held in the tool holder) for tool body and tool actuation linkage latching. It provides a structure which positively latches the wrist to the tool body in such a way that torsional loads as well as direct loads are reacted through the wrist. Furthermore, the coupler positively latches the tool actuating linkage to the high force actuator in the coupler in such a way that push and pull forces are reacted through the actuator. In addition, it provides the necessary linkage for push-pull forces and it is capable of disengaging the tool to permit it to be rejected by withdrawing the control arm.

In use, before a tool is engaged by the coupler, hydraulic fluid is delivered to the first and second latching cylinders so that the first and second latching mechanisms are moved to the position shown in FIG. 2 of the drawings in which the detents are free to be ramped into the latching sleeves. In addition, hydraulic fluid is supplied to the actuator cylinder 58 to extend the actuator piston to the position shown in FIG. 2 in which the outer end thereof projects a substantial distance from the end of the tool holder. The outer end of the tool actuator is then inserted in the socket 36 of the required tool and the coupler is telescoped with respect to the tool and the actuator stem until both the first and second latching means are operably located with respect to the body of the tool and the tool stem respectively. The first and second latching mechanisms are then activated to ramp the detents into their associated latching recesses in the tool body and tool actuator respectively to secure the tool body with respect to the tool holder and to secure the manipulator stem with respect to the tool actuator. Thereupon, the tool may be moved to any required location and rotatably driven by the interconnection formed between the tool holder and the body of the tool and the actuator mechanism of the tool may be operated by varying the pressure in the actuator cylinder 58 to cause the actuator piston 52 to reciprocate relative to the tool holder.

Various modifications of the present invention will be apparent to those skilled in the art without departing from the scope thereof.

What I claim as my invention is:

1. A coupler for connecting a tool body and its associated tool actuator linkage to a manipulator arm of a remote manipulator device comprising:
   (a) a tool holder adapted to be secured to the manipulator arm, first latching means on the tool holder at one end thereof for releasably securing a tool body with respect to said tool holder;
   (b) a tool actuator piston mounted in a first cylinder located within said tool holder, said tool actuator piston having second latching means at one end thereof for releasably securing a tool actuator arm thereto, said second latching means being located at said one end of said tool holder inwardly from said first latching means, said first cylinder being connectable to a source of pressurized fluid whereby said tool actuator piston may be reciprocally driven with respect to said tool holder in response to variations in fluid pressure in said first cylinder between an extended position and the retracted position to provide a drive force for driving a tool actuator of a tool held fast with respect to said tool holder by said first latching means, said one end of said tool actuator piston projecting outwardly a substantial distance from said one end of said tool holder so as to be readily visible to facilitate insertion thereof into a socket in a tool to be coupled by the coupler to said manipulator arm.

2. A coupler for connecting a tool body and its associated tool actuator linkage to a manipulator arm of a remote manipulator device comprising:
   (a) a tool holder comprising,
      (i) a coupler body having an actuator cylinder located therein, said actuator cylinder having a longitudinal axis,
      (ii) a first latching passage opening inwardly from one end of said coupler body, on said longitudinal axis to receive a tool body,
      (iii) first detent means mounted in said coupled body for movement into and out of said latching passage,
      (iv) first ramp means mounted on said coupler body outwardly from said first detent means for movement relative to said coupler body in the direction of said longitudinal axis for ramping said first detent means inwardly and outwardly with respect to said first latching passage,
      (v) a first latching cylinder formed in said coupler body outwardly from said actuator cylinder,
      (vi) a first latching piston on said fist ramp means slidably mounted in said first latching cylinder for movement in the direction of said longitudinal axis between a latching position securing said detent means in its latching position and a release position permitting release of said first detent means; and
   (b) a tool actuator comprising,
      (i) an actuator piston slidably mounted in said actuator cylinder of said coupler body on said longitudinal axis, for movement between an extended position and a retracted position in response to variations in fluid pressure within said actuator cylinder, said actuator cylinder piston having a free end exposed at said first end of said coupler body, said free end of said actuator piston projecting outwardly a substantial distance from said one end of said coupler body when in said extended position so as to be readily visible to facilitate insertion thereof into a socket in a tool in use,
      (ii) a second latching passage opening inwardly from said free end of said actuator piston on said longitudinal axis to receive said tool actuator linkage,
      (iii) second detent means mounted on said actuator piston for movement relative to said actuator piston into and out of latching engagement with a tool actuator linkage located in said latching passage in use, (iv) second ramp means mounted on said actuator piston outwardly from said second detent means for movement relative to said actuator piston in the direction of said longitudinal axis for ramping said second detent means inwardly and outwardly with respect to said second latching passage, (v) a second latching cylinder formed in said actuator piston, (vi) a second latching piston connected to said second ramp means and slidably mounted in said second latching cylinder for movement in the direction of said longitudinal axis between a latching position securing said second detent means in its latching position and a release position permitting release of said second detent means, (vii) conduit means extending between said coupler body and said second latching cylinder for conveying pressurized fluid to and from said second latching cylinder in all positions of said tool actuator with respect to said tool holder.

3. In a remote manipulator device which includes a manipulator arm, a tool and a coupler for releasably connecting the tool to the manipulator arm, the improvement wherein;

(a) said tool comprises a tool body having a male coupling face at one end thereof and a socket opening outwardly from said one end, and a tool actuator linkage mounted on said tool body for movement relative thereto, said tool actuator linkage including an actuator stem having its free end disposed within and accessible at said socket, first latching recess means formed in said male coupling face and second latching recess means formed in said actuator stem, and wherein said coupler comprises:

(a) a tool holder comprising, (i) a coupler body adapted to be secured to a manipulator arm and having an actuator cylinder located therein, a first latching passage opening inwardly from one end of said coupler body to receive said male coupling face of said tool body in a close fitting relationship, first detent means mounted on said coupler body for movement into and out of latching engagement with said first latching recess means of said tool body, first ramp means mounted on said coupler body outwardly from said first detent means for movement relative to said coupler body for ramping said detent means inwardly and outwardly with respect to said first locking recess in use, a first latching cylinder formed in said coupler body outwardly from said actuator cylinder, a first latching piston on said first ramp means slidably mounted in said first latching cylinder for movement relative to said coupler body between a latching position securing said first detent means in latching engagement with said first latching recess means and a release position permitting release of said first detent means from said first latching recess mean and, (b) a tool actuator comprising, (i) an actuator piston slidably mounted in said actuator cylinder for movement between an extended position and a retracted position in response to variations in fluid pressure within said actuator cylinder, said actuator piston having a free end exposed at said first end of said coupler body, said free end of said actuator piston projecting outwardly a substantial distance from one end of said coupler body when in said extended position so as to be readily visible to facilitate insertion thereof into said socket of said tool, a second latching passage opening inwardly from said free end of said actuator piston to receive said free end of said tool actuator stem in a close fitting relationship, second detent means mounted on said actuator piston for movement relative to said actuator piston into and out of latching engagement with said second locking recess means of said actuator pin, second ramp means mounted on said actuator piston outwardly from said first detent means for movement relative to said actuator piston for ramping said second detent means into and out of locking engagement with said latching recess means of said actuator stem, a second latching cylinder formed in said actuator piston, a second latching piston on said second ramp means slidably mounted in said second latching cylinder for movement relative to said actuator piston between a latching position securing said second detent means in its latching position and a release position for permitting release of said second detent means.

* * * * *